US008217806B2

(12) United States Patent
Kim

(10) Patent No.: US 8,217,806 B2
(45) Date of Patent: Jul. 10, 2012

(54) METHOD AND APPARATUS FOR PROVIDING PARKING INFORMATION

(75) Inventor: Dai Jong Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 448 days.

(21) Appl. No.: 12/555,537

(22) Filed: Sep. 8, 2009

(65) Prior Publication Data

US 2010/0060485 A1 Mar. 11, 2010

(30) Foreign Application Priority Data

Sep. 9, 2008 (KR) ........................ 10-2008-0088715

(51) Int. Cl.
*B60Q 1/48* (2006.01)

(52) U.S. Cl. ....................... 340/932.2; 340/933; 340/436

(58) Field of Classification Search ................ 340/932.2
See application file for complete search history.

(56) References Cited

U.S. PATENT DOCUMENTS

| | | | | |
|---|---|---|---|---|
| 6,970,101 | B1 * | 11/2005 | Squire et al. | 340/932.2 |
| 7,957,900 | B2 * | 6/2011 | Chowdhary et al. | 701/300 |
| 2005/0280555 | A1 * | 12/2005 | Warner, IV | 340/932.2 |
| 2008/0165030 | A1 * | 7/2008 | Kuo et al. | 340/932.2 |
| 2009/0207044 | A1 * | 8/2009 | Tomita et al. | 340/932.2 |
| 2010/0007525 | A1 * | 1/2010 | Shanbhag et al. | 340/932.2 |

* cited by examiner

*Primary Examiner* — George Bugg
*Assistant Examiner* — Kerri McNally
(74) *Attorney, Agent, or Firm* — Birch, Stewart, Kolasch & Birch, LLP

(57) ABSTRACT

A method and apparatus, where the apparatus includes: a transmitting/receiving unit for receiving location information of other vehicles existing in a limited area by communicating with the other terminals via a mesh network; a controller for identifying an available parking space by analyzing the location information of the other terminals; and a display unit for displaying the available parking space.

19 Claims, 5 Drawing Sheets

METHOD AND APPARATUS FOR PROVIDING PARKING INFORMATION

CROSS REFERENCE TO RELATED APPLICATIONS

This nonprovisional application claims priority under 35 U.S.C. §119(a) on Patent Application No. 10-2008-0088715 filed in Republic of Korea on Sep. 9, 2008 the entire contents of which are hereby incorporated by reference.

BACKGROUND OF THE INVENTION

1. Field of the Invention

This document relates to a method and apparatus for providing motor vehicle parking information.

2. Discussion of the Related Art

Recently, with a massive expansion in car/truck ownership and a rapid increase in car/truck utilization, there has been an increase in the number and size of parking lots. Thus, for a driver wanting to park at a specific area, the time consumed to find an available parking lot in the corresponding area, to approach the corresponding parking lot, to find an available parking space, and to park his or her car has been consistently growing longer and longer.

SUMMARY OF THE INVENTION

An aspect of this document is to provide a method and apparatus for providing parking information, which allows a driver to park without spending as much time as possible.

In one aspect of the present invention, there is an apparatus for providing parking information that includes: a transmitting/receiving unit for receiving location information of other vehicles by communicating with the other terminals existing in a limited area via a mesh network; a controller for identifying an available parking space by analyzing the location information of the other terminals; and a display unit for displaying the available parking space.

The controller may determine that a space corresponding to a location information, which does not change for a preset time, among the location information is not the available parking space.

The controller may identify the available parking space by matching the location information to elements of a matrix.

The controller may identify a space corresponding to an element which does not match the location information among the elements of the matrix as being the available parking space.

If at least one of the location information matches at least one of other nearby elements that do not correspond to the location information, the controller may identify a space corresponding to an element which does not match the location information as being the available parking space.

The transmitting/receiving unit may communicate with an external server providing traffic information and receive a parking area information corresponding to the limited area from the external server.

The controller may identify the available parking space by referring to the parking area information.

The display unit may display a graphic image processed so as to distinguish the available parking space from other space.

The graphic image may be formed in a map form, and the display unit may display a guidance for guiding the driver to the available parking space.

In another aspect of the present invention, there is a method for providing parking information that includes: receiving location information of other vehicles by communicating with the other terminals existing in a limited area via a mesh network; identifying an available parking space by analyzing the location information of the other terminals; and displaying the available parking space.

As described above, according to the present invention, the time consumed for parking can be reduced since a vehicle to be parked is guided to the location of an available parking space.

Furthermore, it is possible to avoid a situation in which a driver approaches a parking lot in spite of there being no parking space, thus consuming time and cost, and to allow the driver to find and immediately approach a parking lot with an available space.

BRIEF DESCRIPTION OF THE DRAWINGS

The implementation of this document will be described in detail with reference to the following drawings in which like numerals refer to like elements.

DETAILED DESCRIPTION

Hereinafter, an exemplary embodiment will be described in detail with reference to the attached drawings.

Figure 1:
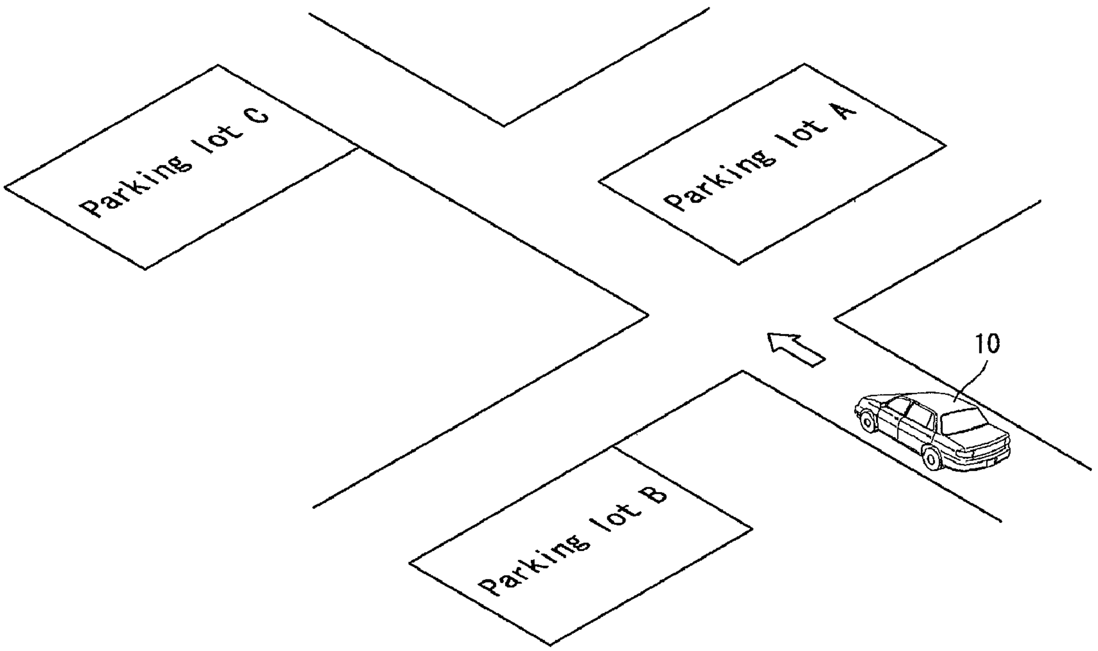
FIG. 1 is a view for explaining a method for providing parking information according to the present invention.

FIG. 1 is a view for explaining the provision of parking information according to this exemplary embodiment.

FIG. 1 shows a vehicle 10 approaching a destination with three parking lots A, B, and C existing near the destination.

The vehicle 10 forms a wireless mesh network with other vehicles existing near the destination and receives information on the locations of these other vehicles.

The wireless mesh network can efficiently expand the range of wireless communication because it is capable of multi-hopping and multi-linking. Standardization activities of the wireless mesh network are underway in IEEE 802.11 TGs.

The wireless communication terminal is able to select a plurality of communication routes within the wireless mesh network and transmit data. Accordingly, the reliability of data transmission can be improved.

Therefore, via a wireless mesh network, the vehicle 10 can perform peer-to-peer wireless communications with other nearby wireless communication terminals through a wireless communication terminal mounted therein. Further, the wireless communication terminal mounted within the vehicle 10 is able to communicate with other wireless communication terminals that are beyond a direct communication range through other nearby wireless communication terminals by a multi-hop method.

The above wireless mesh network is one example of a wireless network that can be used in the present invention. Other wireless networks satisfying the aforementioned functions may also be used.

The vehicle 10 refer to all types of carriers implemented using a mechanic or electronic devices to move human beings or objects, such as general passenger cars, trucks, buses, trains, etc.

In this specification, while embodiments of the present invention will be described focused on wireless communication terminals to be mounted in a general passenger car and capable of communicating with each other by forming a wireless mesh network, the present invention is not limited thereto and may also apply to other communication apparatuses having these functions.

The vehicle 10 has a terminal mounted therein or thereon that can communicate with other terminals mounted in or on other vehicles constituting the wireless mesh network. Therefore, the vehicle 10 can receive location information of peripheral vehicles from other terminals by using the terminal mounted therein, analyze the received location information, identify an available parking space in accordance with the analyzed location information, and transfer the analyzed location information to the user via graphic, text and/or audio signals.

The vehicle 10 forming the wireless mesh network may locate other vehicles existing near the destination, compare the locations of these vehicles with information of a parking lot existing near the destination, and present, on a specific matrix, whether the corresponding vehicles are parked or not and the parking locations thereof.

For example, in a case where the locations of the corresponding vehicles do not change for a preset time, for example, more than one minute, and are identified as being the inside of the parking lot, the locations of those other vehicles can be matched to the matrix by comparing them with each other.

Figure 2A:
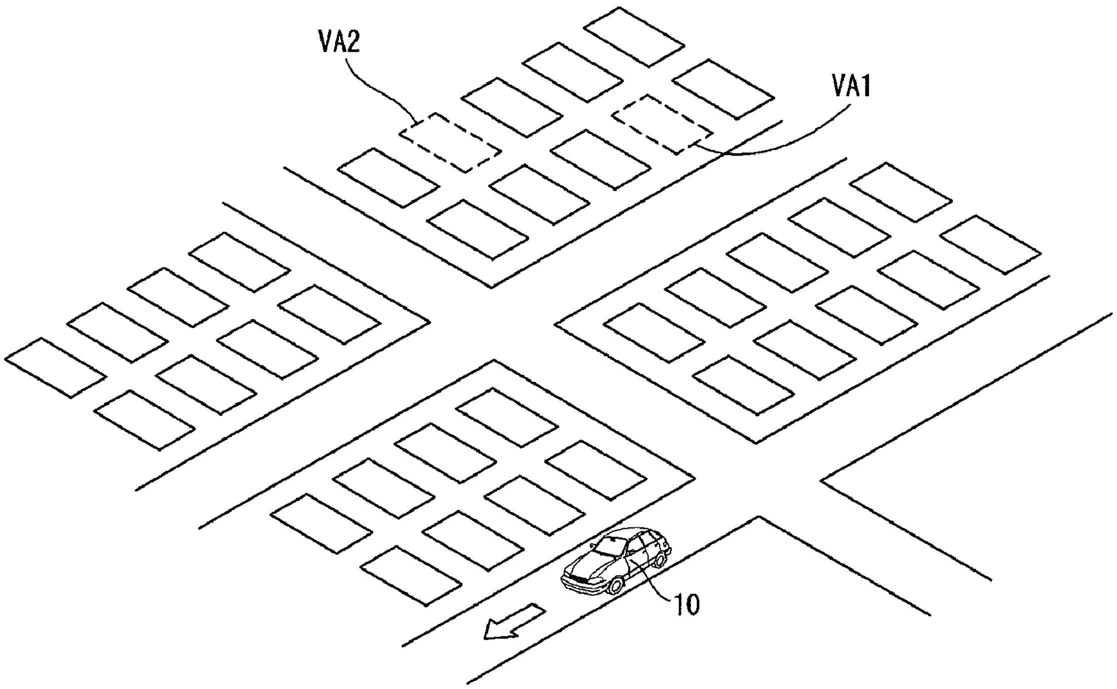
FIGS. 2*a* and 2*b* are views for explaining in more detail the method for providing parking information according to the present invention.

FIG. 2*a* is one example showing available parking spaces of a parking lot which a vehicle is approaching.

Referring to the drawing, at present, two available parking spaces VA1 and VA2 exist in the parking lot, and the other places are all occupied by vehicles.

A vehicle 10 forms a wireless mesh network with the vehicles parked in the parking lot to be approached, and may directly connect to the parked vehicles to receive location information (for example, latitude, longitude, and altitude) of the directly connected vehicles, or may receive location information of vehicles that cannot be directly connected by the vehicle 10 by communication with the directly connected vehicles.

Figure 2B:
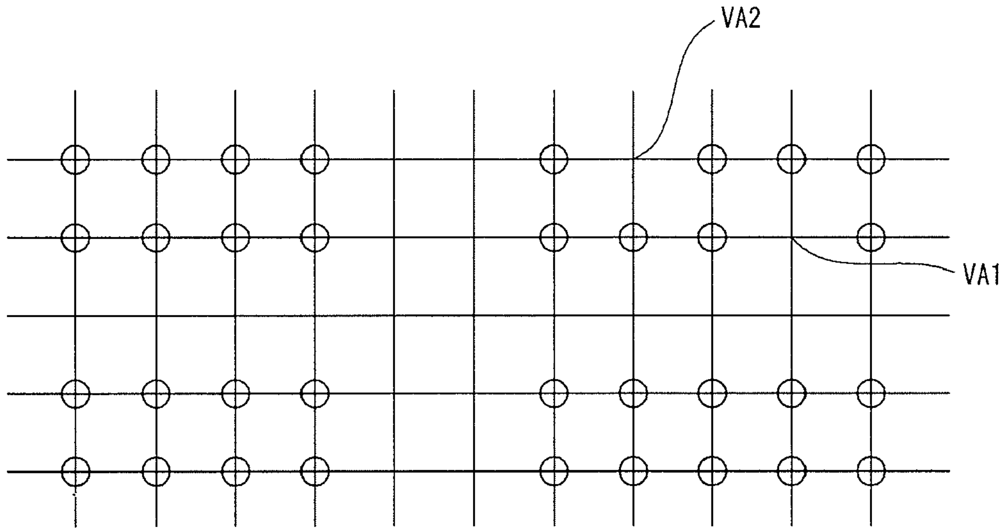

FIG. 2*b* shows an example in which a graph is constructed by analyzing location information received by communication with the vehicles parked in the parking lot of FIG. 2*a* via the mesh network. Referring to the drawings, any change in the location information of peripheral vehicles is tracked for more than a preset time and compared with parking lot information to plot the locations of the respective vehicles on a graph, and such a graph is analyzed again to locate an available parking space.

On the graph configured in accordance with the locations of the parked vehicles, the respective vehicles are represented as elements of the matrix of the graph corresponding to their locations. Thus, it is possible to detect whether vehicles are parked in the corresponding locations or not in accordance with the presence or not of the vehicles corresponding to the respective elements of the matrix.

In addition, referring to the graph, it can be seen that no vehicle is parked in the third row and the fifth and sixth columns. In this case, the corresponding row and columns can be identified as not being a parking space.

However, it can be seen that, in spite of there being a vehicle parked at least one of the elements close to the two parking spaces VA1 and VA2, there is no vehicle parked in the corresponding spaces. Therefore, the corresponding spaces may be identified as spaces where no vehicle is parked in spite of their availability, that is to say, available parking spaces.

Consequently, considering that people are more likely to park their cars in spaces that are generally preferred in a parking lot, there is an effect that parking spaces as near as possible to spaces where other vehicles are parked are recommended as first available parking spaces.

Even though there is no vehicle parked at all of the nearby elements, if the distance to the boundary of the parking lot from a space is more than a preset distance, (for example, 3 m) and there is at least one parked vehicle on a line which is extended in the row or column direction of the corresponding element, the space can be identified as an available parking space.

In this manner, even when parking information is not given in detail, an available parking space of the corresponding parking lot can be located by analysis of the graph constructed in accordance with the parking locations of vehicles.

Figure 3:
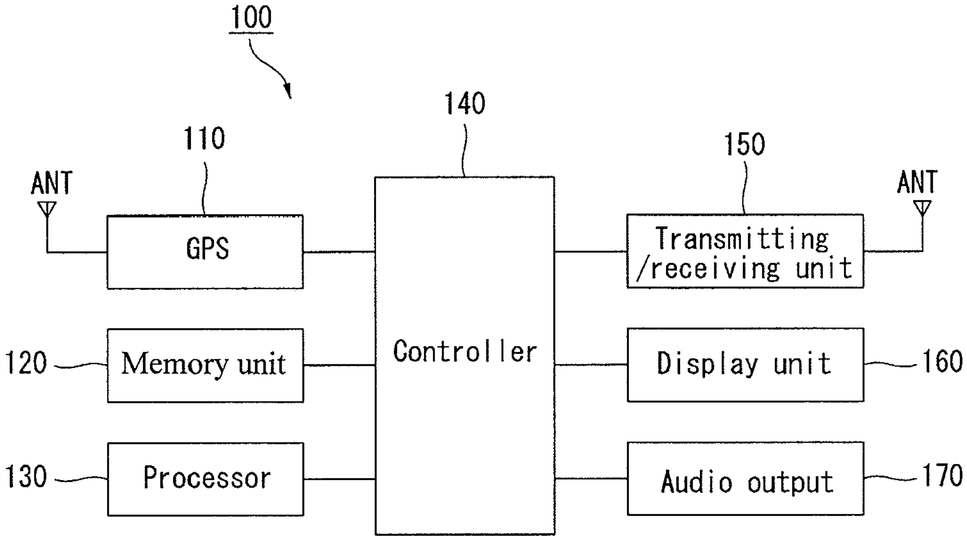
FIG. 3 is a block diagram for explaining an apparatus for providing parking information according to the present invention.

FIG. 3 is a block diagram showing the construction of a terminal according to this embodiment.

The terminal 100 refers to all kinds of communication terminals capable of performing communication in order to for a mesh network with other terminal. In addition, the terminal 100 may include all types of portable terminals which are mounted in a vehicle and provided with a display capable of displaying graphic information by interworking with a GPS receiver (GPS module) that receives a navigation message from a GPS satellite within the vehicle. Hereinafter, the vehicle 10 will be described by way of example of various types of portable terminals, including a navigation terminal having a GPS.

Referring to FIG. 3, the terminal 100 includes a GPS receiver 110, a memory 120, a processor 130, a controller 140, a transmitting/receiving unit 150, a display 160, and an audio output unit 170.

The GPS receiver 110 receives a navigation message transmitted from the GPS satellite via an antenna (not shown) and provides the message to the processor 140. Thus, the terminal 100 can perform various functions performed by using a navigation message, including the provision of a navigation function based on a navigation message or the collection of travel information of the vehicle 10 having the terminal 100 mounted therein. Here, the GPS receiver 110 may be include in a terminal as in this example, but may be mounted as a separate device in a vehicle and connected to the terminal 100 to perform its function.

The memory 120 stores programs and data required for performing various functions provided by the terminal and various data generated in accordance with the operation of the terminal 100.

Further, the memory 120 stores location information of peripheral vehicles transmitted and received by the transmitting/receiving unit 150, and stores various data required for the processor 130 to analyze the location information.

Especially, the memory 120 stores various data, including graphic data required to display parking information resulting from the analysis of the location information on the display unit 160 and audio files for audio outputting.

Further, the memory 120 stores map data required for operating the vehicle 10 based on the navigation message received from the GPS satellite. The map data may include various geographical data including topographical information, graphic data, and POI (point of interest) information, as well as basic data including, for example, road junctions such as an intersection with other roads, a network of links connecting the junctions, and a link distance.

In addition, the terminal 100 does not store the map data in an electronic map format due to a limited memory capacity, the above-described various geographical data may be stored in the form of text in the memory 120.

The processor 130 analyzes location information of peripheral vehicles to detect whether the peripheral vehicles are parked or not, and analyzes the pattern of the parking locations to represent it on a matrix and calculate parking information, such as an available parking space.

The controller 140 controls the overall operation of each of the components of the terminal 100. Particularly, the controller 140 receives the location information of peripheral vehicles through the transmitting/receiving unit 150 and stores them in the memory 120, and receives parking information resulting from the analysis of the location information of the peripheral vehicles, graphically processes them, and displays them on the display unit 160.

Further, the controller 140 may control the GPS receiver 110 to analyze a received navigation message, collect information, such as the current location of the vehicle 10 and the speed of the vehicle 10, based on the analyzed navigation message, store them in the memory 120, and perform route guidance in accordance with the information.

The controller 140 may collect the location and speed of the vehicle 10 by comprehensively analyzing a navigation message received by the GPS receiver 110 and information inputted through various sensors (not shown), such as a gyroscope and a speed sensor, which are installed in the vehicle 10.

In addition, the above-stated graph is constructed through an analysis of location information by the processor 130, and hence vehicle-parked spaces, available parking spaces, and spaces where parking is not allowed, such as entrance and exit lanes, are separately determined. These information can be inputted, as parking information, into the controller 140.

Subsequently, the controller 140 is able to guide the user to an available parking space through the display unit 160 by using the parking information containing the corresponding graph.

To this end, the controller 140 converts the parking information inputted through the processor 130 into graphic image information by using the text and graphic information stored in the memory 120 and displays them on the display unit 160. Further, if necessary, the controller 140 may retrieve the corresponding audio source file stored in the memory and allow the audio output unit 170 to produce and output an audio signal.

In this embodiment, the processor 130 and the controller 140 are implemented as separate components, but they may be implemented as one component, such as a central processing unit (CPU) having sufficient information processing capacity, to perform both information processing and control functions.

The transmitting/receiving unit 150 receives location information of the vehicles located in the vicinity of the vehicle 10 in direct communication with peripheral terminals or in a multi-hop method in according with control of the controller 140. The transmitting/receiving unit 150 is provided with a communication module required for forming a mesh network with such peripheral vehicles.

In addition, the transmitting/receiving unit 150 may further include a module for communicating with an external server (not shown) providing traffic information. In this case, the controller 140 may receive information on parking areas, such as the layout maps of internal parking areas of parking lots near the destination, from the external server (not shown) through the transmitting/receiving unit 150, and may provide these information to the processor 130 to perform the above-stated determination of an available parking space more accurately.

In addition, the transmitting/receiving unit 150 may transmit to the external server (not shown) available parking space information resulting from the determination of an available parking space derived from the parking locations of the respective vehicles received via the mesh network in communication with the external server (not shown).

Accordingly, the external server (not shown) may consolidate and update the available parking space information transmitted from a plurality of communication terminals and send feedback with latest information to each of the communication terminals.

Further, upon receipt of the latest available parking space information from the external server (not shown) through the transmitting/receiving unit 150, the terminal 100 may modify and supplement the available parking space information calculated by itself.

The controller 140 receives location information of other vehicles in communication with peripheral vehicles by controlling the transmitting/receiving unit 150, and performs the reception of such location information for more than a preset time to check changes with time in the location information.

The display 160 may be implemented as a display device, such as a liquid crystal display LDC, to display a video signal inputted from the controller 140.

Further, the display 160 is implemented as a touch screen to perform a display function. Moreover, the display 160 may be implemented to display various functions of the terminal 100 in a menu structure and also simultaneously perform an input function for executing a menu selected according to a touch using the user's finger or a stylus pen.

The audio output unit 170 may receive an audio file from the memory 120 and generate an audio signal set for alarm or voice announcement under the control of the controller 140. Further, if the navigation function is performed, the audio output unit 170 generates an audio signal set for voice announcement to guide the user along a selected route, amplifies the signal to a certain set level, and outputs the amplified signal through one or more speakers (not shown).

Besides, the terminal 100 may include an input unit (not shown) for receiving various operation commands from the user and applying the input commands to the controller 140 so that, for example, a parking lot search command can be inputted from the user.

Figure 4:
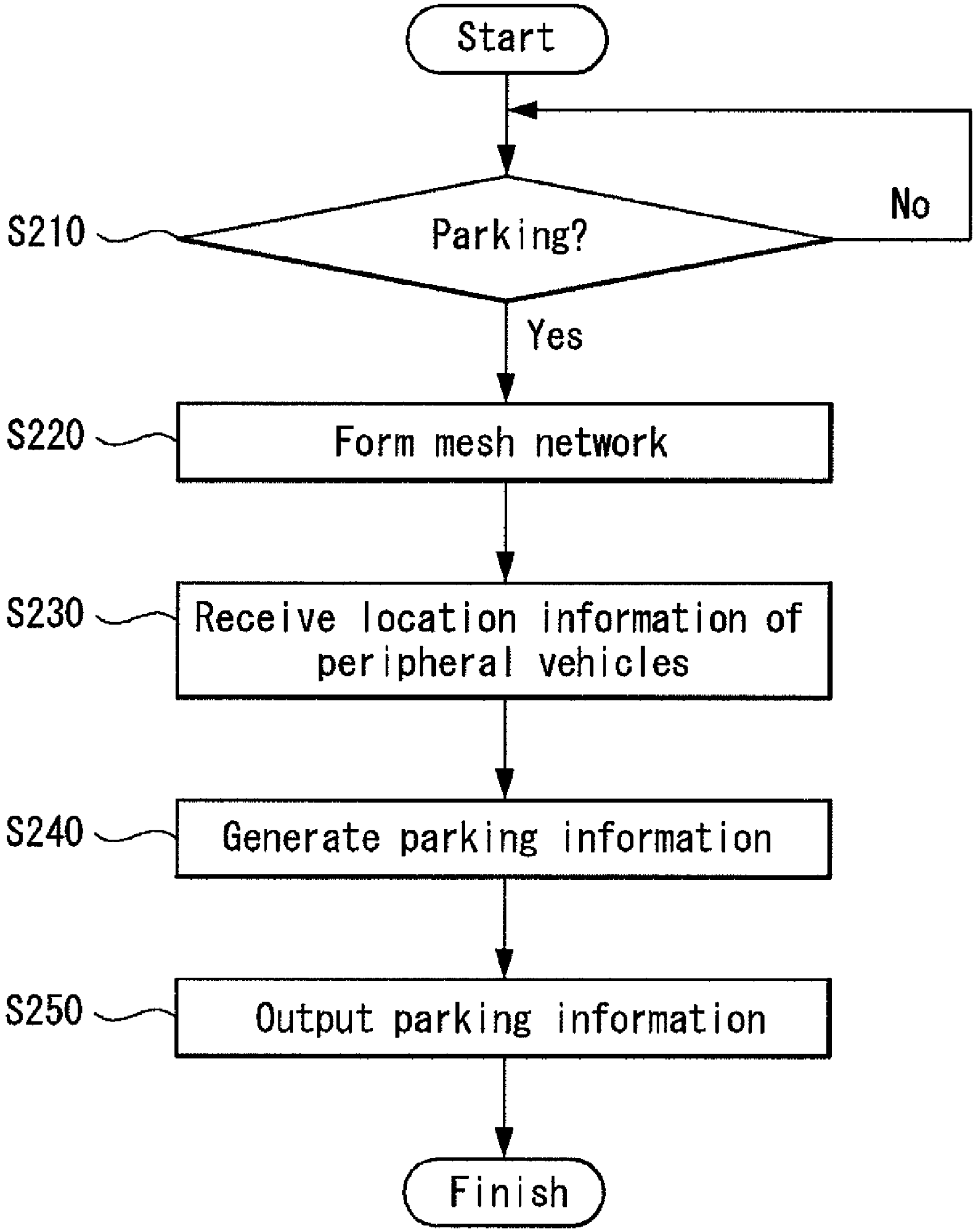
FIG. 4 is a flow chart for explaining the method for providing parking information according to the present invention.

FIG. 4 is a flow chart for explaining a method for providing parking information according to the present invention.

Referring to FIG. 4, the controller 140 determines whether this is a situation requiring parking, such as a situation in which the vehicle arrives near a destination set according to a route guidance function and requires parking or a situation in which a parking lot search command is inputted by the user [S210]. This can be determined based on a user input or based on the terminal determining that the vehicle is within a predetermined distance of the destination.

As a result, if parking is required, the controller 140 retrieves map data, such as POI (point of interest) information and gets peripheral parking lot information, and performs a communication operation for forming a mesh network with vehicles existing within a corresponding parking lot [S220].

Then, the controller 140 receives location information of the vehicles existing within the corresponding parking lot via the formed mesh network [S230].

Next, the controller 140 generates parking information by analyzing the location information of the vehicles through the processor 130. The processor 130 analyzes the location information of the vehicles existing within the parking lot and identifies all of parking areas of the parking lot except for spaces where parking is not allowed, such as the entrance and exit lanes, and distinguishes spaces where vehicles are presently parked from empty spaces, available parking spaces and generates parking information [S240].

Meanwhile, in case of communication with the external server (not shown) providing traffic information through the transmitting/receiving unit 150, the controller 140 is provided with information on all of the parking areas of the parking lot from the external server (not shown) through the transmitting/receiving unit 150, thereby further improving the accuracy of the parking information generation process.

Further, the controller 140 may transmit, to the external server through the transmitting/receiving unit 150, parking information resulting from the determination of an available parking space derived from the parking locations of the respective vehicles.

Further, the controller 140 may receive, from the external server (not shown) through the transmitting/receiving unit 150, latest parking information which is generated by integrating parking information transmitted from a plurality of communication terminals, and may modify and supplement the parking information generated in step S240.

The controller 140 forms image information for guiding the vehicle to an available parking space in accordance with the parking information generated in the processor 130, and outputs on the display unit 160.

Figure 5A:
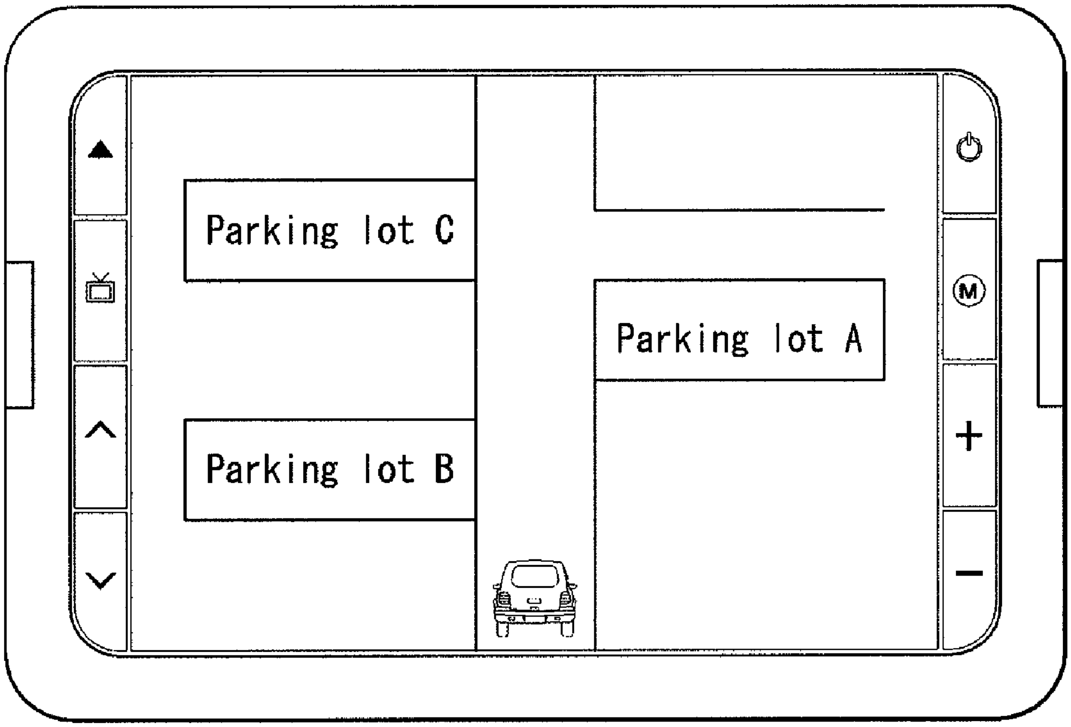
FIGS. 5*a* to 5*c* are views for explaining a screen displayed on the apparatus for providing parking information according to the present invention.
Figure 5B:
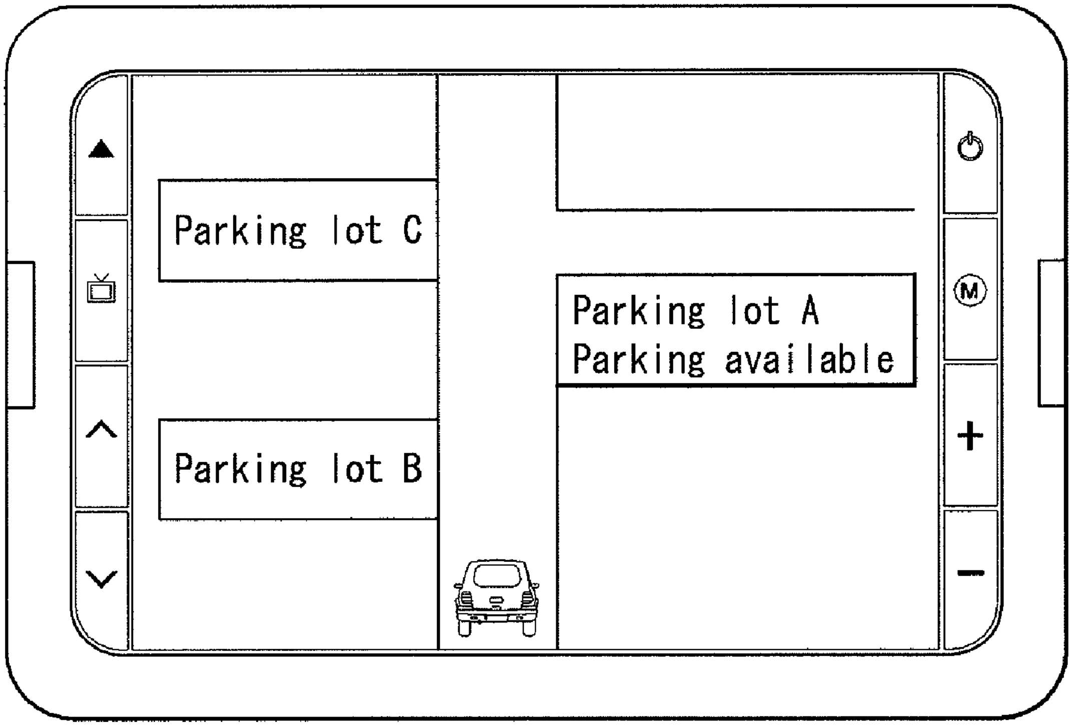
Figure 5C:
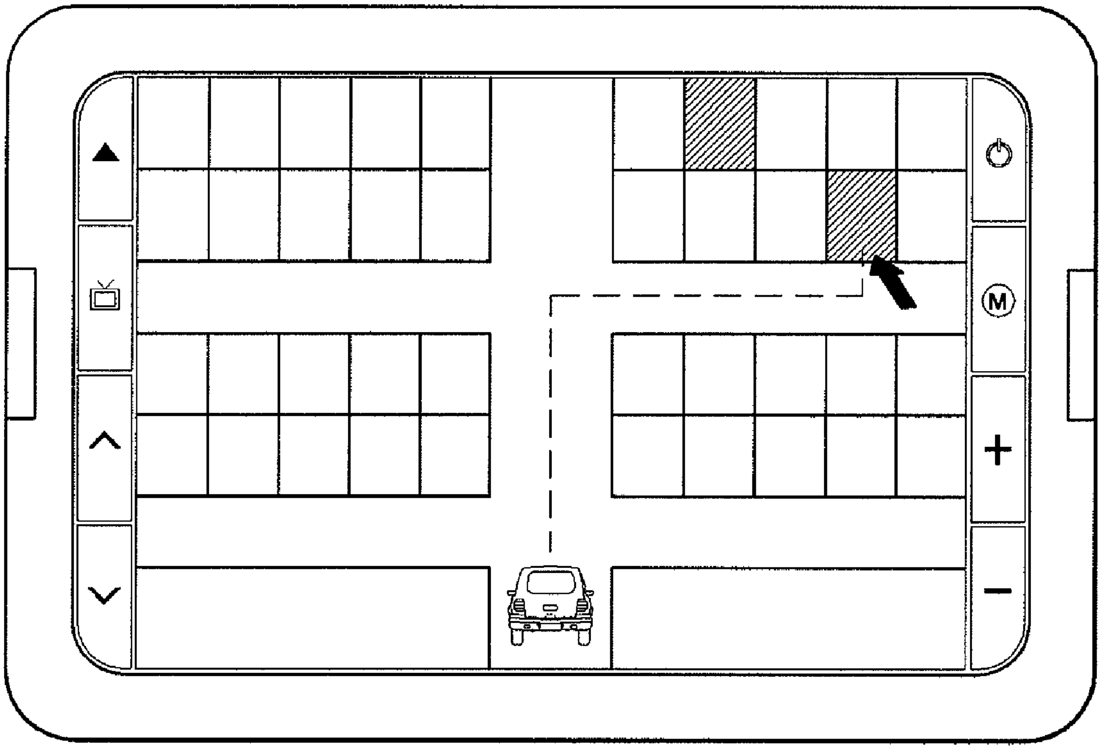

FIGS. 5*a* to 5*c* are views for explaining in more detail the step of displaying parking information on the display unit.

Referring to FIG. 5*a*, if the vehicle 10 requires parking, the controller 140 may display the location of a parking lot near the destination, for example, as map data, on the display unit 160. In this case, as shown in the drawings, there may a plurality of parking lots.

In addition, the controller 140 may check whether there is an available parking space by performing the steps S220 to S240 in the order of proximity of parking lots near the destination.

Referring to FIG. 5*b*, if there is an available parking space in the parking lot (A) nearest to the destination, the controller 140 may display on the display unit 160 the presence of an available parking space in the corresponding parking lot and inform the driver of parking information.

Therefore, if the vehicle 10 approaches the corresponding parking lot (A), the controller 140 constructs graphic image information representing available parking space, for example, in a map form, with reference to the parking information generated in the processor 130, for example, the graph as shown in FIG. 2*b*, and displays the graphic image information on the display unit 160. In this case, an available parking space may be highlighted, marked in a distinctive color, or made to flash so as to be distinguished from other spaces, thereby increasing awareness. Further, the controller 140 may display a travel route toward the available parking space as an upper layer of the graphic image information to thus guide the vehicle 10.

Consequently, the user can immediately proceed to an available parking space and park his or her car without spending time and parking cost while circling the parking lot.

As described thus far, those skilled in the art related to the field of the present invention would understand that various substitutions, modifications, and changes are possible within the technical spirit of the present invention, without being limited to the exemplary embodiments and attached Figures described herein.

What is claimed is:

1. An apparatus configured to be installed in a motor vehicle and to provide parking information, comprising:

a transmitting/receiving unit configured to receive location information of other vehicles existing in a predetermined area by communicating with the other vehicles via a mesh network;

a controller configured to identify an available parking space by analyzing the location information of the other vehicles; and a display unit configured to display the available parking space, wherein the controller is further configured to determine that a space corresponding to a location of a specific vehicle that has not changed location for a preset time is not the available parking space.

2. The apparatus of claim 1, wherein the controller is configured to identify the available parking space by matching the location information to elements of a matrix.

3. The apparatus of claim 2, wherein the controller is configured to identify a space corresponding to an element of the matrix as being the available parking space.

4. The apparatus of claim 3, wherein, if at least one item of the location information matches at least one element adjacent to a specific element which does not match the location information, the controller is configured to identify a space corresponding to the at least one element which does not match the location information as being the available parking space.

5. The apparatus of claim 1, wherein the transmitting/receiving unit is configured to communicate with an external server providing traffic information, and to receive parking area information from the external server.

6. The apparatus of claim 5, wherein the controller is configured to identify the available parking space by referring to the received parking area information.

7. The apparatus of claim 1, wherein the display unit is configured to display a graphic image that distinguishes the available parking space from other spaces.

8. The apparatus of claim 7, wherein the graphic image is a map image.

9. The apparatus of claim 8, wherein the display unit is configured to display guidance information for guiding a driver of the motor vehicle to the available parking space.

10. A method for providing parking information to a driver of a motor vehicle, comprising:

receiving location information of other vehicles existing in a predetermined area by communicating with the other vehicles via a mesh network;

identifying an available parking space by analyzing the location information of the other vehicles; and displaying the available parking space, wherein the identifying step comprises determining that a space corresponding to a location of a specific vehicle that has not changed location for a preset time is not the available parking space.

11. The method of claim 10, wherein the identifying step comprises:

identifying the available parking space by matching the location information to elements of a matrix.

12. The method of claim 11, wherein the identifying step comprises:

identifying a space corresponding to an element which does not match the location information among the elements of the matrix as being the available parking space.

13. The method of claim 12, wherein if at least one item of the location information matches at least one element adjacent to a specific element which does not match the location information, the identifying step comprises identifying a space corresponding to the at least one element which does not match the location information as being the available parking space.

14. The method of claim 10, further comprising:

receiving parking area information from an external server.

15. The method of claim 14, wherein the identifying step comprises:

identifying the available parking space based on the received parking area information.

16. The method of claim 10, wherein the displaying step comprises:

displaying a graphic image that distinguishes the available parking space from other spaces.

17. The method of claim 16, wherein the graphic image is a map image.

18. The method of claim 17, wherein the displaying step comprises:

displaying guidance information for guiding a driver of the motor vehicle to the available parking space.

19. A motor vehicle, comprising:

an apparatus configured to provide parking information, including:

a transmitting/receiving unit configured to receive location information of other vehicles existing in a predetermined area by communicating with the other vehicles via a mesh network;

a controller configured to identify an available parking space by analyzing the location information of the other vehicles; and a display unit configured to display the available parking space, wherein the controller is further configured to determine that a space corresponding to a location of a specific vehicle that has not changed location for a preset time is not the available parking space.

* * * * *